United States Patent
Saeki (10) Patent No.: US 11,235,815 B2
(45) Date of Patent: Feb. 1, 2022

(54) FRONT PORTION STRUCTURE OF VEHICLE

(71) Applicant: Toyota Jidosha Kabushiki Kaisha, Toyota (JP)

(72) Inventor: Koji Saeki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 16/683,388

(22) Filed: Nov. 14, 2019

(65) Prior Publication Data

US 2020/0156708 A1    May 21, 2020

(30) Foreign Application Priority Data

Nov. 21, 2018    (JP) .............................. JP2018-218518

(51) Int. Cl.
  *B62D 25/12*    (2006.01)
  *B62D 25/10*    (2006.01)
  *B62D 25/08*    (2006.01)

(52) U.S. Cl.
  CPC ........... *B62D 25/12* (2013.01); *B62D 25/084* (2013.01); *B62D 25/105* (2013.01)

(58) Field of Classification Search
  CPC ....... B62D 25/12; B62D 25/105; B62D 25/08
  See application file for complete search history.

(56) References Cited

U.S. PATENT DOCUMENTS

2006/0064845 A1    3/2006    Fujii et al.

FOREIGN PATENT DOCUMENTS

JP    2006-096282 A    4/2006

*Primary Examiner* — D Glenn Dayoan
*Assistant Examiner* — Melissa Ann Bonifazi
(74) *Attorney, Agent, or Firm* — Dinsmore & Shohl LLP (57) ABSTRACT

A vehicle front portion structure includes a hood, a radiator support upper member, a bracket mounted on an upper portion of the radiator support upper member, and a stopper attached to an upper portion of the bracket and configured to be contacted, when the hood is closed, by a protruding portion on a lower surface of the hood, in which the bracket is a member having a channel shape in cross section and protruding upward in a vehicle vertical direction, and is composed of leg plates and a top plate. The bracket is mounted on the upper portion of the radiator support upper member in a state where the leg plates and the top plate extend along a vehicle width direction, and the leg plates also extend in the vehicle vertical direction along a direction in which the protruding portion makes contact with the stopper.

6 Claims, 7 Drawing Sheets

FRONT PORTION STRUCTURE OF VEHICLE

CROSS REFERENCE TO RELATED APPLICATION

This application claims priority to Japanese Patent Application No. 2018-218518 filed on Nov. 21, 2018, which is incorporated herein by reference in its entirety including the specification, claims, drawings, and abstract.

TECHNICAL FIELD

The present disclosure relates to a front portion structure of a vehicle, and in particular to a structure of a bracket mounted on a radiator support and configured to retain a stopper which is contacted by a lower surface of a hood when the hood is closed.

BACKGROUND

There has been suggested a structure in which a rubber stopper to be contacted by a lower surface of a hood when the hood is closed is disposed via a bracket on a radiator support. For example, JP 2006-96282A discloses a bracket composed of two leg plates whose lower ends are joined to a radiator support and a top plate which connects the two leg plates and has an upper surface on which the stopper is disposed, the leg plates being inclined toward a vehicle rear region. In the bracket, when an impact load is exerted on the hood in a diagonally downward and rearward direction of a vehicle, the leg plates are bent toward the vehicle rear region, to thereby absorb impact energy.

In this regard, there may be a case where the hood is closed forcefully. In this case, the bracket might receive a great force exerted in a vehicle downward direction. In the bracket disclosed in JP 2006-96282A according to conventional art, the leg plates, which are inclined toward the vehicle rear region, may be deformed when receiving a great downward force that is exerted in the vehicle downward direction upon closure of the hood.

Under the circumstances, an object of the present disclosure is to prevent deformation of a bracket when a hood is closed forcefully while allowing the bracket to absorb impact energy when an impact load is applied onto the hood in a diagonally downward and rearward direction of a vehicle.

SUMMARY

A front portion structure of a vehicle according to the present disclosure includes a hood having a rear end which is pivotably supported at a rear end of a front compartment located in a front region of the vehicle and a front end which is configured to be lifted up and down for opening and closing the front compartment, a radiator support upper member disposed in an upper front region within the front compartment so as to extend along a vehicle width direction, a bracket mounted on an upper portion of the radiator support upper member, and a stopper attached to an upper portion of the bracket and composed of an elastic body that is contacted, when the hood is closed, by a protruding portion provided to a lower surface of a front end portion of the hood. In the front portion structure, the bracket is a channel shaped member having a channel shape in cross section and protruding upward in a vehicle vertical direction, and is composed of two leg plates whose lower ends are fixed to the radiator support upper member and a top plate which connects the leg plates, and the bracket is mounted on the upper portion of the radiator support upper member in such a manner that the leg plates and the top plate extend along the vehicle width direction, and the leg plates also extend in the vehicle vertical direction along a contact direction in which the protruding portion is brought into contact with the stopper.

In the above-described structure, because the leg plates of the bracket are fixed to the upper portion of the radiator support upper member so as to extend along the vehicle width direction, it becomes possible that when an impact load is applied onto the hood in a diagonally downward and rearward direction of the vehicle, the leg plates are deformed so as to be bent toward a vehicle rear region, thereby absorbing impact energy. In addition, because the leg plates of the bracket extend in the vertical direction along the contact direction in which the protruding portion is brought into contact with the stopper, a leg portion of the bracket is prevented from becoming deformed by an impulsive force of closing the hood even though the hood is closed with an excessive force.

In the front portion structure of a vehicle according to the present disclosure, the radiator support upper member may have a cross section shape formed like a hat protruding upward in the vehicle vertical direction, in which the bracket may be mounted on a top surface of the radiator support upper member at a position located forward of a centroid of the cross section of the radiator support upper member.

In the front portion structure of a vehicle according to the present disclosure, the cross section shape of the radiator support upper member may be horizontally symmetrical in a vehicle longitudinal direction, and the bracket may be mounted on the top surface of the radiator support upper member at a position located forward of a centerline of the radiator support upper member when viewed side-on.

Because the bracket is mounted at the position located forward of the cross section centroid of the radiator support upper member as described above, the impact load input onto the hood along the diagonally downward and rearward direction of the vehicle is transmitted as an input toward the centroid of the radiator support upper member. This can prevent the possibility that the impact force would escape through the radiator support upper member rotated by the impact load, which would hamper sufficient collapse of the leg portion of the bracket, and would, in turn, causes a decrease in absorption of impact energy.

In the front portion structure of a vehicle of the present disclosure, the stopper may be attached to an upper surface of the top plate of the bracket, and a lower end of the stopper may penetrate through the top plate of the bracket and extend to a position close to the top surface of the radiator support upper member.

In the above-described structure, when the leg portion of the bracket is collapsed by the impact load applied to the bracket in the diagonally downward and rearward direction of the vehicle, the stopper composed of the elastic body is caught between the top surface of the radiator support upper member and the lower surface of the hood, to thereby receive a compressive load, which can, in turn, cause the stopper to absorb the impact energy.

According to the present disclosure, it becomes possible that deformation of the bracket is hampered when the hood is closed with an excessive force, while impact energy of an impact load is absorbed when the impact load is applied onto the hood along the diagonally downward and rearward direction of the vehicle.

BRIEF DESCRIPTION OF DRAWINGS

An embodiment of the present disclosure will be described based on the following figures, wherein.

DESCRIPTION OF EMBODIMENT

Figure 1:
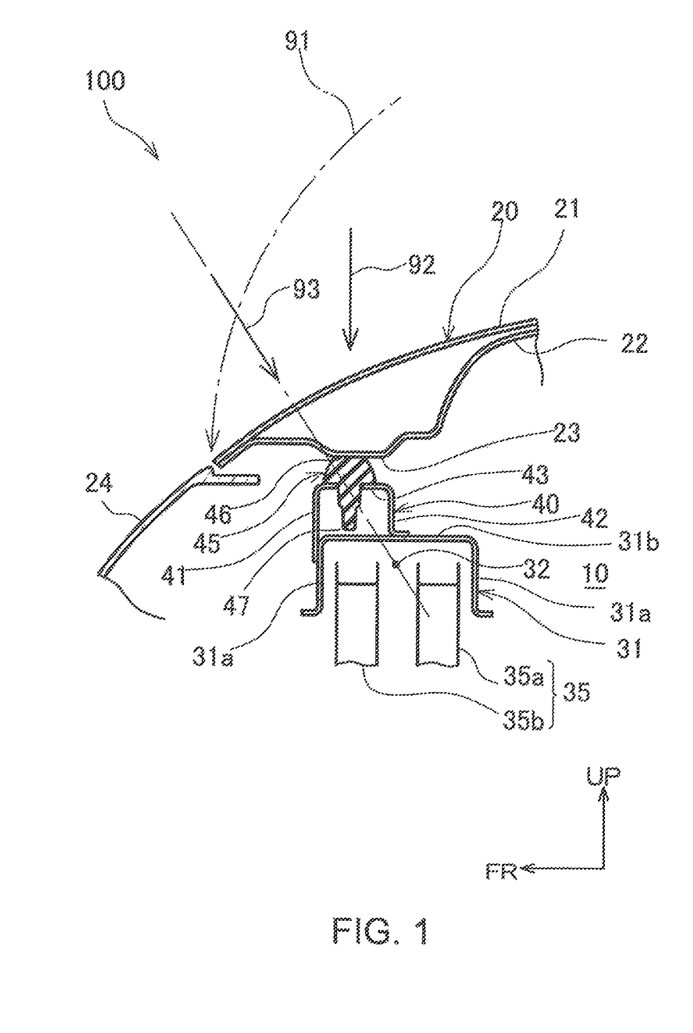
FIG. 1 is a cross section view of a front portion structure of a vehicle according to an embodiment.

Hereinafter, a vehicle front portion structure 100 according to an embodiment will be described with reference to the drawings. As shown in FIG. 1, the vehicle front portion structure 100 is composed of a hood 20, a radiator support upper member 31, a bracket 40, and a stopper 45. It should be noted that arrows identified with reference characters FR, UP, and RH in the drawings represent a forward direction (a travel direction), an upper direction, and a right direction of a vehicle, respectively. Further, directions opposite to those indicated by the arrows FR, UP, and RH correspond to a rearward direction, a lower direction, and a left direction of the vehicle. In the following description, unless otherwise specified, simple expressions of front and rear, right and left, and upward and downward denote front and rear in a vehicle longitudinal direction, right and left in a vehicle lateral direction (vehicle width direction), and upward and downward in a vehicle vertical direction, respectively.

The hood 20 is pivotably supported at its rear end by a rear end of a front compartment 10 arranged in a vehicle front region, and has a front end which is configured to be lifted up and down as indicated by a dotted chain line 91 for opening and closing the front compartment 10. The front compartment 10 is a space defined in the vehicle front region to house an engine, a motor for driving the vehicle, and other components. The hood 20 is composed of a hood panel outer member 21 disposed on an upper side of the hood 20 and a hood panel inner member 22 disposed on a lower side of the hood 20. A protruding portion 23 is formed so as to protrude downward on a lower side of a front end portion of the hood panel inner member 22. The protruding portion 23 is brought into contact with an upper end 46 of a stopper 45, which will be explained below, when the hood 20 is closed. It should be noted that in FIG. 1, reference numeral 24 represents a front grille.

The radiator support upper member 31 placed in an upper front region within the front compartment 10 is a structural member having a hat shaped cross section and extending along the vehicle width direction. The hat shaped cross section of the radiator support upper member 31 is composed of two flanges 31a of front and rear flanges extending in the vehicle vertical direction and a web 31b extending in the vehicle longitudinal direction so as to connect the two flanges 31a. The radiator support upper member 31 is connected to a radiator support lower member (not illustrated) disposed below the radiator support upper member 31 in the front region within the front compartment 10 and further connected to a left-side radiator support L (not illustrated) and a right-side radiator support R (not illustrated) both extending along the vertical direction on both vehicle widthwise ends of the radiator support upper member 31, so as to form a square frame in which a cooling module 35 composed of a radiator 35a and an air-conditioner heat exchanger 35b are housed.

Figure 2:
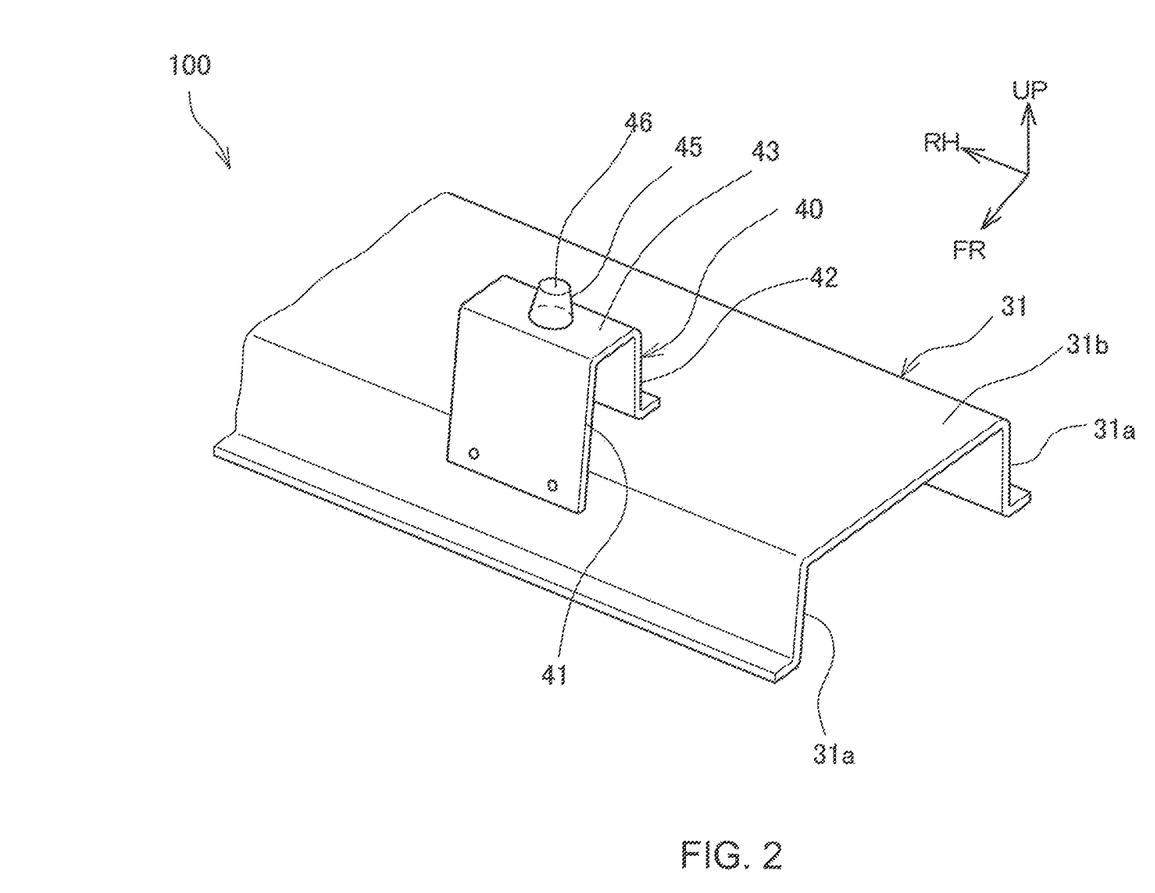
FIG. 2 is a perspective view representing a radiator support upper member, a bracket, and a stopper illustrated in FIG. 1.

The bracket 40 is mounted on an upper portion of the radiator support upper member 31. The bracket 40 is a connection member for disposing the stopper 45, which is attached to an upper portion of the bracket 40, on an upper side of the radiator support upper member 31. The bracket 40 is a channel member composed of a front leg plate 41 whose lower end is joined to the radiator support upper member 31, a rear leg plate 42, and a top plate 43 which connects the front leg plate 41 and the rear leg plate 42, and has in cross section a channel shape protruding upward in the vehicle vertical direction. As shown in FIG. 2, the bracket 40 is mounted on the upper portion of the radiator support upper member 31 in a state where the front leg plate 41, the rear leg plate 42, and the top plate 43 extend along the vehicle width direction. The front leg plate 41 is spot-welded, as indicated by hollow circles in FIG. 2, to the front flange 31a of the radiator support upper member 31, and extends upward in the vehicle vertical direction. The rear leg plate 42 is spot-welded to an upper surface of the web 31b, and extends upward in the vehicle vertical direction.

The stopper 45 is a member composed of an elastic material, such as rubber, which receives, when the hood 20 is closed, the protruding portion 23 provided to a lower surface of the front end portion of the hood panel inner member 22. The stopper 45 is attached to an upper surface of the top plate 43 of the bracket 40. A lower end 47 of the stopper 45 extends through the top plate 43 of the bracket 40 to a position close to a top surface of the radiator support upper member 31.

As shown in FIG. 1, the bracket 40 is mounted on the top surface of the radiator support upper member 31 at a position located forward of a cross section centroid 32 of the radiator support upper member 31.

Here, a position of the cross section centroid 32 of the radiator support upper member 31 is explained with reference to FIG. 3. The centroid 32 is located at a position obtained by multiplying a minute area dA of the cross section of the radiator support upper member 31 by a distance from an origin to the minute area dA of the cross section to find an integrated first moment S of area of the cross section, and dividing the first moment S of area of the cross section by an area A of the cross section.

A first moment Sx of area of the cross section in an x direction and a first moment Sy of area of the cross section in a y direction are calculated by Equations (1) and (2) described below. Then, a position Xg of the centroid 32 in the x direction and a position Yg of the centroid 32 in the y direction are calculated by Equations (3) and (4) described below.

[Equation 1]

$$Sx = \int dA \times x \tag{1}$$

[Equation 2]

$$Sy = \int dA \times y \quad (2)$$

[Equation 3]

$$Xg = Sx/A \quad (3)$$

[Equation 4]

$$Yg = Sy/A \quad (4)$$

Figure 3:
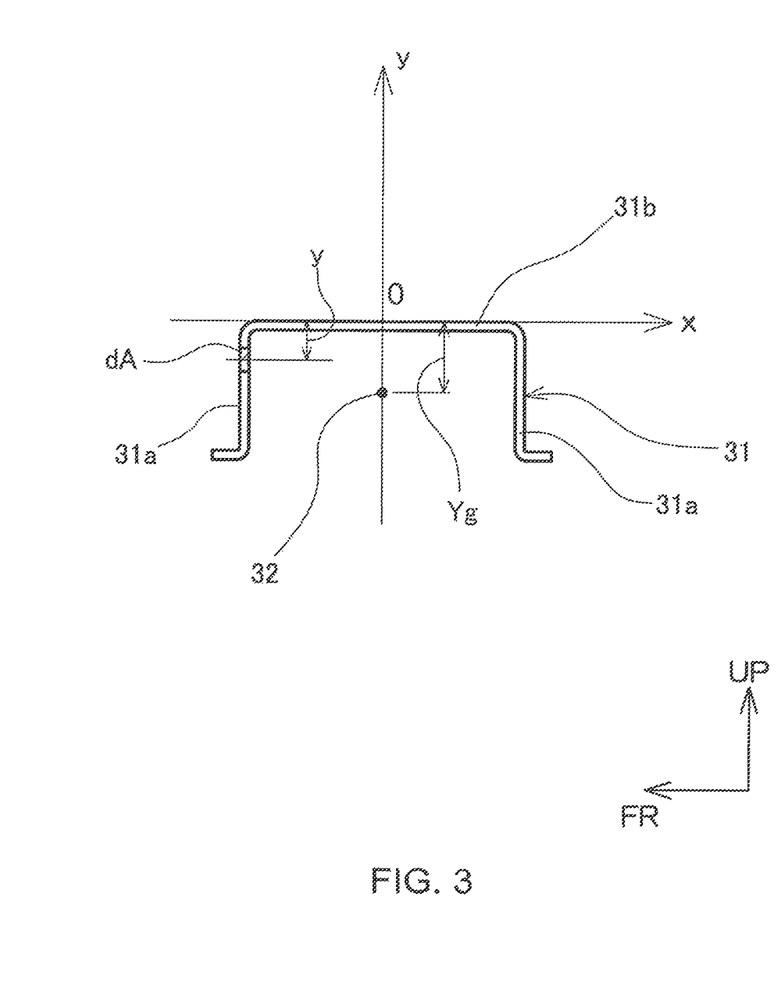
FIG. 3 is a diagram for explaining calculation of a centroid.

As shown in FIG. 3, for a hat shaped cross section which is horizontally symmetrical in the vehicle longitudinal direction, such as the cross section of the radiator support upper member 31, the position of the centroid 32 in the longitudinal direction (x direction) matches a longitudinal center position of the hat shaped cross section (i.e., Xg=0), while the position of the centroid 32 in the vertical direction (y direction) is slightly displaced from the middle point between the web 31b and the lower end of the flange 31a toward the web 31b. Accordingly, in the vehicle front portion structure 100, the bracket 40 is mounted on the top surface of the radiator support upper member 31 at a position shifted forward from a centerline of the radiator support upper member 31 viewed side-on.

Next, the direction of loads exerted when the hood 20 is closed and when the hood 20 receives an impact force in the diagonally downward and rearward direction of the vehicle will be described along with deformation of the bracket 40 caused by the loads.

In operation to close the hood 20 as indicated by the dotted chain line 91 in FIG. 1, the hood 20 moves downward in the vehicle vertical direction as indicated by an arrow 92 in FIG. 1 until the protruding portion 23 on the lower surface of the hood 20 is brought into contact with the upper end 46 of the stopper 45. Then, a force applied downward in the vehicle vertical direction from the hood 20 is received by the stopper 45, and transmitted to the radiator support upper member 31 which is the structural member. In other words, when the hood 20 is closed, the protruding portion 23 is moved downward in the vehicle vertical direction relative to the stopper 45 and brought into contact with the stopper 45, which causes the stopper 45 and thus the bracket 40 to receive the load exerted along the vehicle vertical direction which is the direction in which the protruding portion 23 is brought into contact with the stopper 45.

Because the front leg plate 41 and the rear leg plate 42 of the bracket 40 extend upward in the vehicle vertical direction from the top surface of the radiator support upper member 31, the extending direction of the front leg plate 41 and the rear leg plate 42 is in the vehicle vertical direction of the vehicle along the direction in which the protruding portion 23 is brought into contact with the stopper 45. Therefore, the extending direction of the front leg plate 41 and the rear leg plate 42 of the bracket 40 matches the direction of the load exerted when the hood 20 is closed, which allows the front leg plate 41 and the rear leg plate 42 to bear a great compressive force exerted along the vertical direction.

Figure 4:
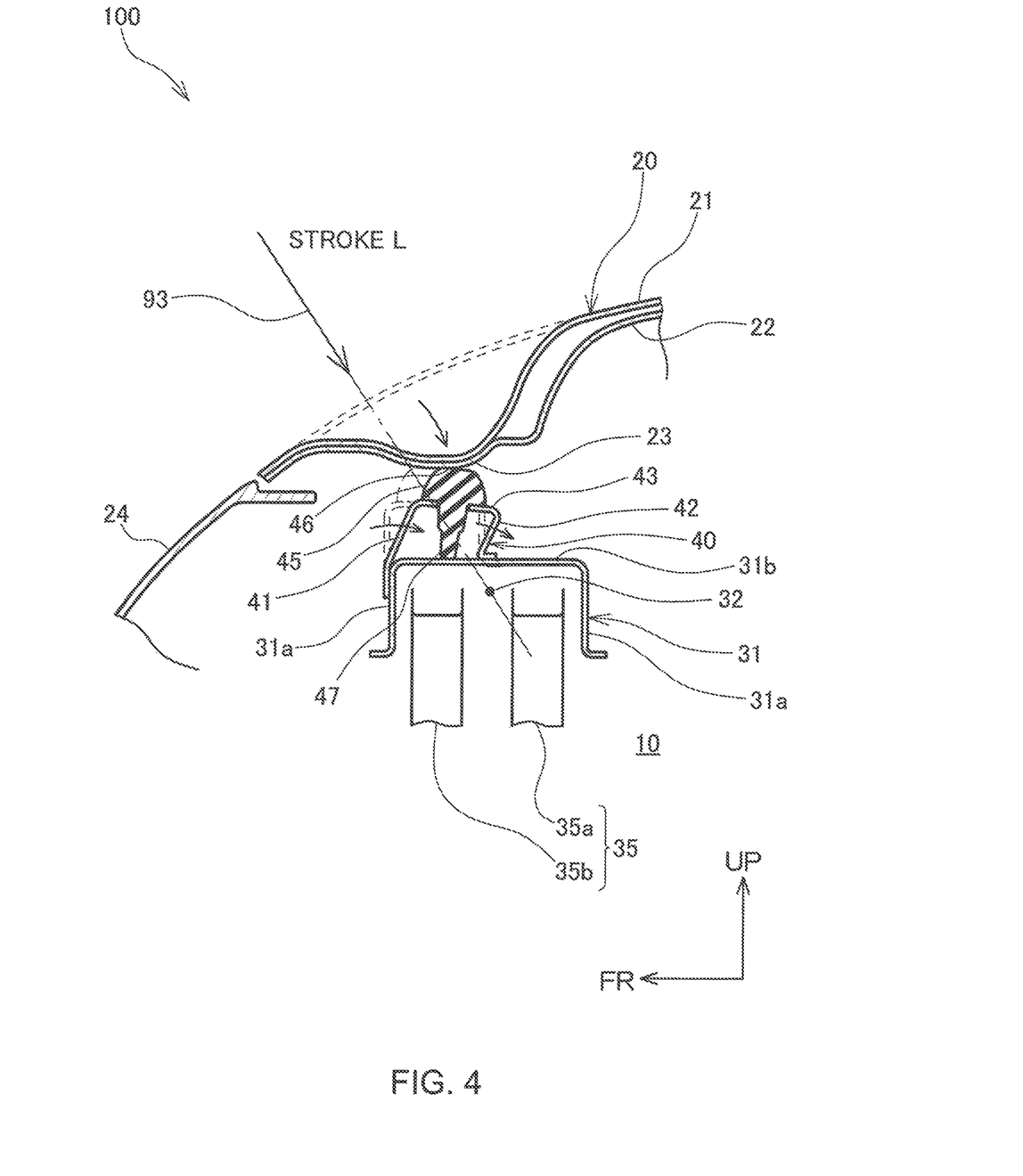
FIG. 4 is a cross section view showing a state of deformation caused when an impact load is applied onto a hood along a diagonally downward and rearward direction of a vehicle in the front portion structure of a vehicle illustrated in FIG. 1.
Figure 5:
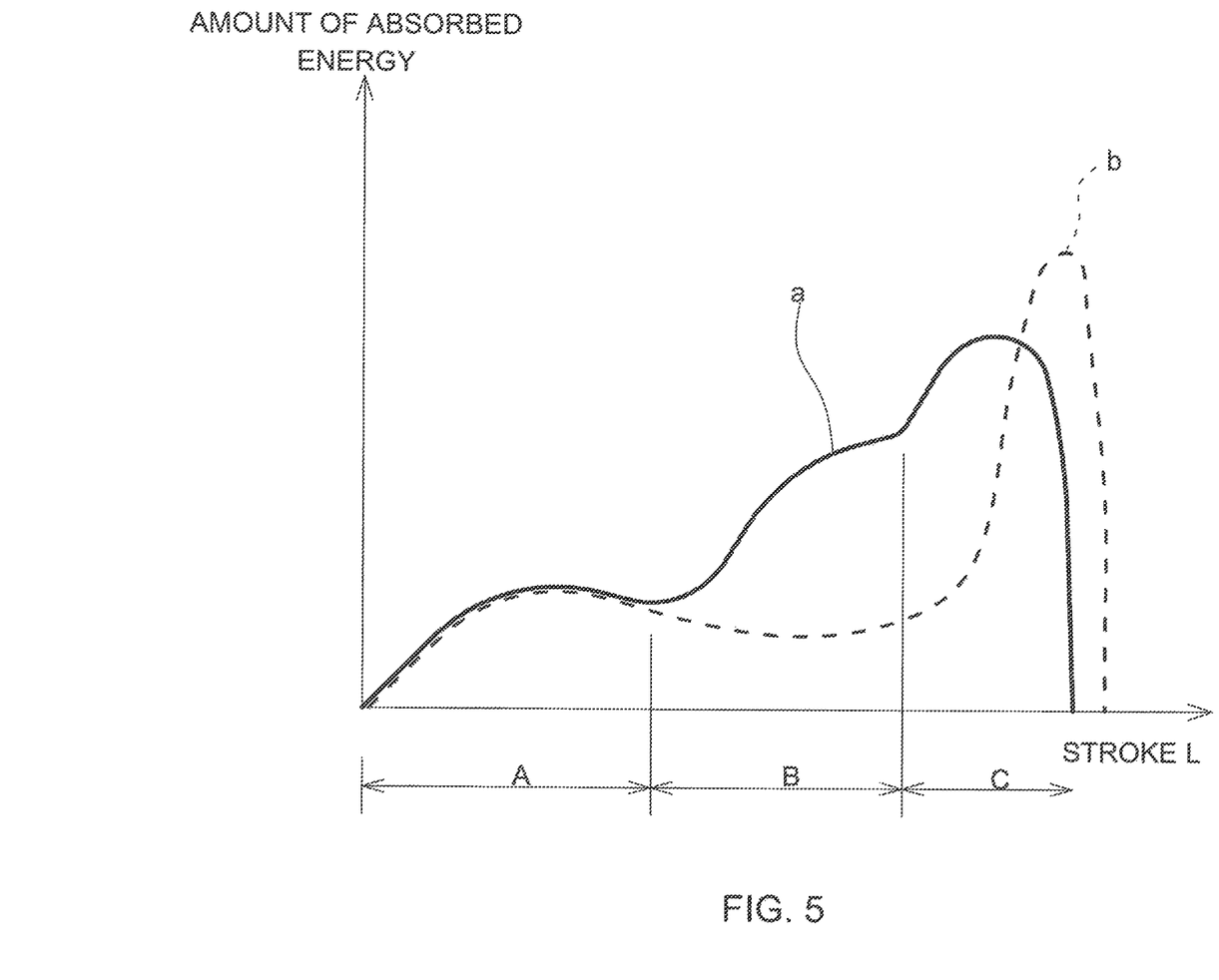
FIG. 5 is a graph representing a relationship between a deformation stroke of an hood and an amount of absorbed impact energy, the impact load being applied onto the hood along the diagonally downward and rearward direction of the vehicle in the front portion structure of a vehicle illustrated in FIG. 1.

On the other hand, when the impact load is applied, for example, onto the hood 20 along the diagonally downward and rearward direction of the vehicle, initially, in a section A shown in FIG. 5, the hood panel outer member 21 is, as shown in FIG. 4, collapsed and pressed against the hood panel inner member 22 by the impact force. In this section, as indicated by a solid line a in FIG. 5, impact energy is absorbed as a diagonally downward deformation stroke of the hood increases.

Then, in a section B of FIG. 5, the impact load in the diagonally downward and rearward direction of the vehicle is applied onto the upper end 46 of the stopper 45. The bracket 40 is mounted on the top surface of the radiator support upper member 31 at the position shifted forward from the cross section centroid 32 of the radiator support upper member 31. For this reason, the impact load applied in the diagonally downward and rearward direction of the vehicle as indicated by an arrow 93 in FIG. 1 is directed toward a region in the vicinity of the centroid 32 of the radiator support upper member 31. Because a force toward the centroid 32 causes no torsional deformation of the radiator support upper member 31, there is no possibility that the impact load would escape through torsional deformation of the radiator support upper member 31. Therefore, as shown in FIG. 4, the front leg plate 41 and the rear leg plate 42 of the bracket 40 experience deformation of being bent at their root portions toward the vehicle rear region. As a result, in the section B, the impact energy is absorbed in bending deformation of the front leg plate 41 and the rear leg plate 42 as the diagonally downward deformation stroke of the hood increases.

Subsequently, in a section C, the lower end 47 of the elastic stopper 45 is brought into contact with the top surface of the radiator support upper member 31, which causes the stopper 45 to be caught between the lower surface of the hood 20 and the top surface of the radiator support upper member 31, and then compressively deformed while absorbing the impact energy.

As has been described above, in the vehicle front portion structure 100 of this embodiment, when the hood 20 is closed, the extending direction of the front leg plate 41 and the rear leg plate 42 of the bracket 40 matches the direction of the load, which allows the front leg plate 41 and the rear leg plate 42 to bear a great compressive force in the vertical direction. This can prevent deformation of the bracket 40 from occurring when the hood 20 is closed.

On the other hand, when the impact load is applied onto the hood 20 along the diagonally downward and rearward direction of the vehicle, the radiator support upper member 31 receives the impact load without experiencing torsional deformation, which allows the front leg plate 41 and the rear leg plate 42 to become bent and thus absorb the impact energy. Moreover, it becomes possible to further absorb the impact energy through compressive deformation of the stopper 45.

Although it has been described in the above embodiment that during the operation to close the hood 20, the stopper 45 is able to receive the force exerted downward in the vehicle vertical direction from the hood 20, the embodiment is not limited to this configuration. For example, in a case where the protruding portion 23 is moved, when the hood 20 is closed, relative to the stopper 45 along a direction which is slightly inclined with respect to the vehicle downward direction, and thus brought into contact with the stopper 45 along the slightly inclined direction, the front leg plate 41 and the rear leg plate 42 may be arranged in positions inclined along the direction in which the protruding portion 23 is brought into contact with the stopper 45, so that the extending direction of the front leg plate 41 and the rear leg plate 42 matches the direction of the load to allow the front and rear leg plates 41 and 42 to bear the great compressive force in the inclined direction.

Further, the cross section shape of the radiator support upper member 31, which has been described in the above embodiment as being horizontally symmetrical in the vehicle longitudinal direction, may not necessarily be symmetrical in the longitudinal direction. In a case where the cross section shape of the radiator support upper member 31 is not symmetrical, the position of the centroid 32 is displaced slightly forward or rearward from the center position of the cross section shape in the longitudinal direction. In this case, the bracket 40 may be mounted at a position located forward of the centroid 32 which is slightly displaced from the center position of the cross section shape. This allows an input of the impact load exerted in the diagonally downward and rearward direction of the vehicle to be transmitted along a direction which passes a region close to the position of the centroid 32, and can, in turn, allow the front leg plate 41 and the rear leg plate 42 to be bent for absorbing the impact energy.

As described above, in the vehicle front portion structure 100, deformation of the bracket 40 can be hampered when the hood 20 is closed with an excessive force, while impact energy of an impact load can be absorbed when the impact load is exerted onto the hood 20 in the diagonally downward and rearward direction of the vehicle.

Next, a vehicle front portion structure 200 according to a comparison example will be described with reference to FIG. 6. The same components as those of the vehicle front portion structure 100 which has been explained with reference to FIGS. 1 to 5 are designated by the same reference numerals as those of the vehicle front portion structure 100, and descriptions related to these components will not be repeated.

Figure 6:
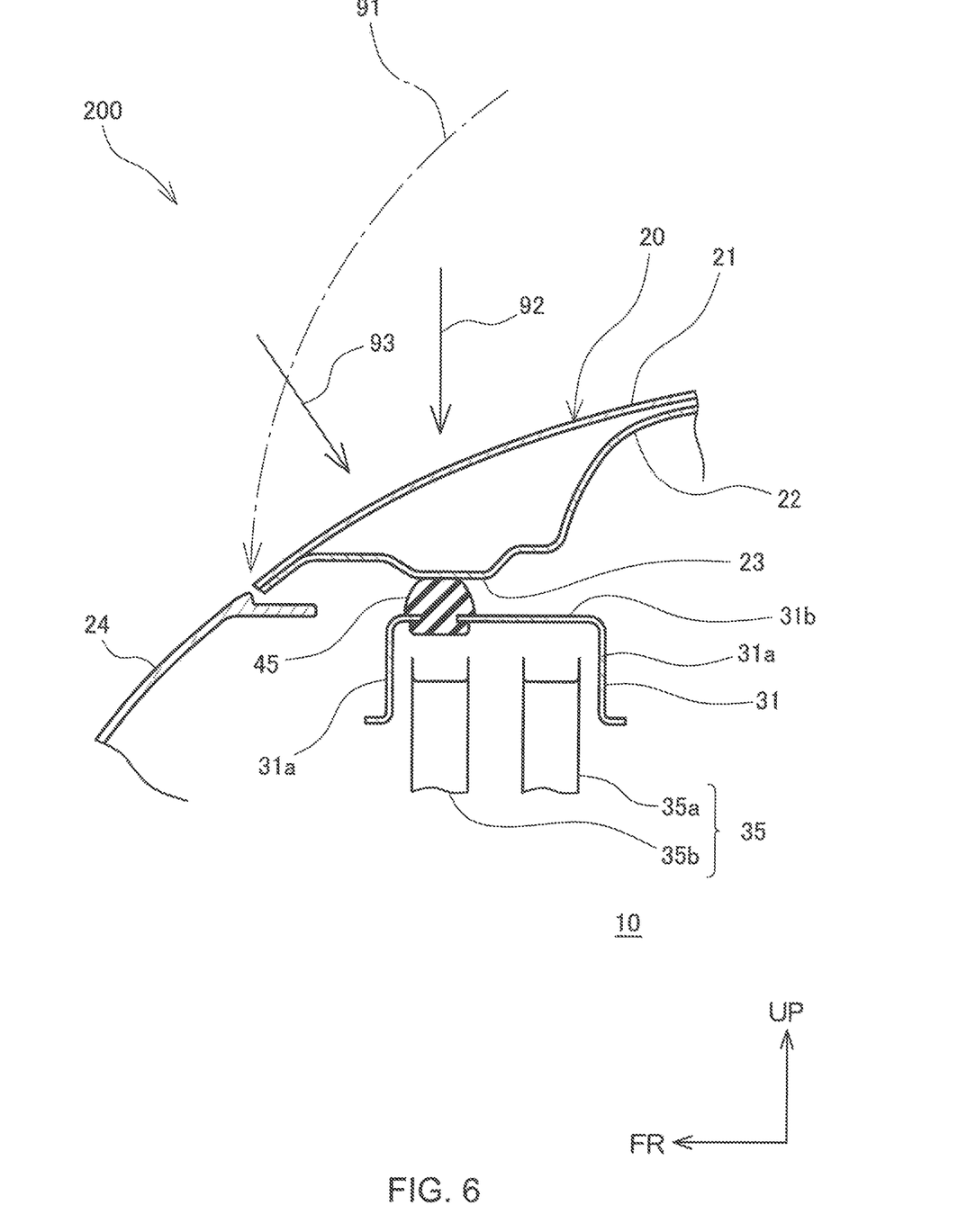
FIG. 6 is a cross section view of a front portion structure of a vehicle according to a comparison example.

The vehicle front portion structure 200 of the comparison example shown in FIG. 6 does not include the bracket 40, in which the stopper 45 is directly attached to a top surface of the web 31b in the radiator support upper member 31. In this case, when the impact load is applied onto the hood 20 along the diagonally downward and rearward direction of the vehicle, the hood panel outer member 21 is collapsed in the section A, to thereby absorb impact energy as indicated by a broken line b in FIG. 5. Then, in the section C, the impact energy is further absorbed through compressive deformation of the stopper 45. However, because the impact energy is not absorbed through bending deformation of the bracket 40 in the vehicle front portion structure 200, an amount of impact energy absorbed in the vehicle front portion structure 200 becomes smaller than that absorbed in the vehicle front portion structure 100 according to the embodiment.

Figure 7:
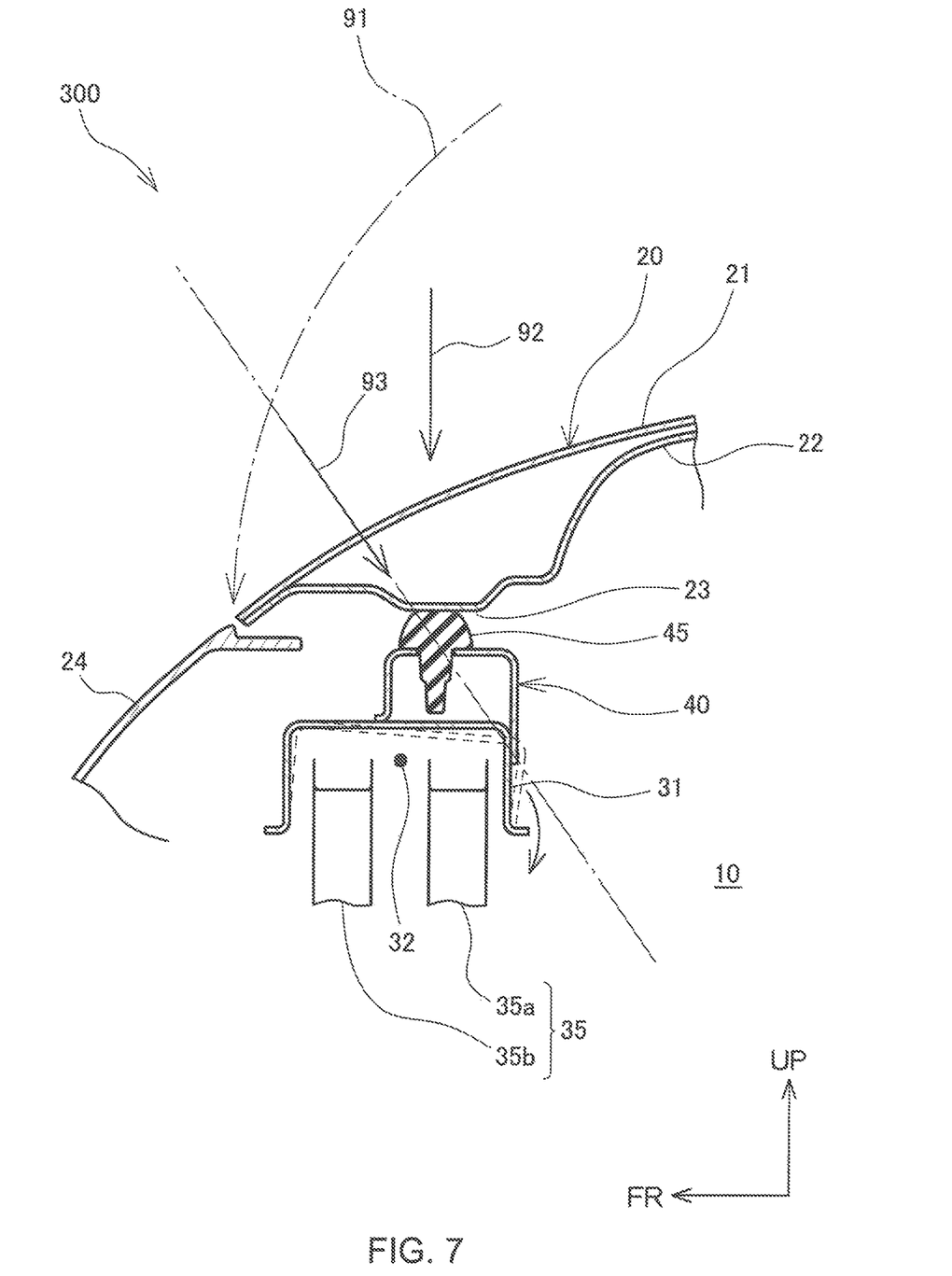
FIG. 7 is a cross section view of a front portion structure of a vehicle according to another comparison example.

Next, a vehicle front portion structure 300 according to another comparison example will be described with reference to FIG. 7. The vehicle front portion structure 300 includes the bracket 40 which is attached to a rear half portion of the radiator support upper member 31 in the vehicle longitudinal direction. In the vehicle front portion structure 300, when the impact load is exerted onto the hood 20 along the diagonally downward and rearward direction of the vehicle, the direction of the load is not on the line extending through the position of the centroid 32 of the radiator support upper member 31, but instead on a line extending rearward of the centroid 32 in the vehicle longitudinal direction. This causes, as shown by a dotted line in FIG. 7, the radiator support upper member 31 to be rotated in the clockwise direction by the impact load, and, in turn, allows the impact load to escape. Therefore, the front leg plate 41 and the rear leg plate 42 are not sufficiently bent, resulting in a decreased amount of absorption of impact energy in the section B of FIG. 5.

As opposed to the comparison example, in the vehicle front portion structure 100 according to the embodiment, when the impact load is exerted onto the hood 20 along the diagonally downward and rearward direction of the vehicle, the radiator support upper member 31 receives the impact load without experiencing bending deformation, which allows the front leg plate 41 and the rear leg plate 42 to be sufficiently bent for absorbing impact energy. In addition, the impact energy can be further absorbed through compressive deformation of the stopper 45. In this way, it becomes possible to absorb a greater amount of impact energy.

The invention claimed is:

1. A front portion structure of a vehicle, comprising:
    a hood having a rear end which is pivotably supported at a rear end of a front compartment located in a front region of the vehicle, and a front end which is configured to be lifted up and down for opening and closing the front compartment;
    a radiator support upper member disposed on an upper front region within the front compartment so as to extend along a vehicle width direction;
    a bracket mounted on an upper portion of the radiator support upper member; and
    a stopper attached to an upper portion of the bracket, and composed of an elastic body that is contacted, when the hood is closed, by a protruding portion provided to a lower surface of a front end portion of the hood, wherein
    the bracket is a channel shaped member having a channel shape in cross section and protruding upward in a vehicle vertical direction, and is composed of two leg plates whose lower ends are fixed to the radiator support upper member and a top plate which connects the leg plates, wherein the bracket is mounted on the upper portion of the radiator support upper member in such a manner that the leg plates and the top plate extend along the vehicle width direction, and
    the leg plates are further configured to extend in the vehicle vertical direction parallel to a contact direction in which the protruding portion is brought into contact with the stopper.

2. The front portion structure of a vehicle according to claim 1, wherein:
    the radiator support upper member has a cross section shape formed like a hat protruding upward in the vehicle vertical direction; and
    the bracket is mounted on a top surface of the radiator support upper member at a position located forward of a centroid of the cross section of the radiator support upper member.

3. The front portion structure of a vehicle according to claim 2, wherein:
    the cross section shape of the radiator support upper member is horizontally symmetrical in a vehicle longitudinal direction; and
    the bracket is mounted on the top surface of the radiator support upper member at a position located forward of a centerline of the radiator support upper member viewed side-on.

4. The front portion structure of a vehicle according to claim 2, wherein:
    the stopper is attached to an upper surface of the top plate of the bracket, and
    a lower end of the stopper penetrates through the top plate of the bracket and extends to a position close to the top surface of the radiator support upper member.

5. The front portion structure of a vehicle according to claim 3, wherein:
   the stopper is attached to an upper surface of the top plate of the bracket, and
   a lower end of the stopper penetrates through the top plate of the bracket and extends to a position close to the top surface of the radiator support upper member.

6. The front portion structure of a vehicle according to claim 1, wherein:
   the radiator support upper member has a cross section shape formed like a hat protruding upward in the vehicle vertical direction;
   the bracket is mounted on a top surface of the radiator support upper member at a position located forward of a centroid of the cross section of the radiator support upper member; and
   the stopper is located forward of a centroid of the cross section of the radiator support upper member.

* * * * *